United States Patent
Namura

(10) Patent No.: US 7,250,829 B2
(45) Date of Patent: Jul. 31, 2007

(54) HIGH FREQUENCY SWITCH

(75) Inventor: Yasuaki Namura, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/549,663

(22) Filed: Oct. 16, 2006

(65) Prior Publication Data

US 2007/0035359 A1    Feb. 15, 2007

Related U.S. Application Data

(62) Division of application No. 10/479,012, filed as application No. PCT/JP02/05618 on Jun. 6, 2002, now Pat. No. 7,146,137.

(30) Foreign Application Priority Data

Sep. 14, 2001    (JP) .............................. 2001-279762

(51) Int. Cl.
*H01P 1/10* (2006.01)
*H04B 1/44* (2006.01)

(52) U.S. Cl. ..................................... 333/104; 333/101

(58) Field of Classification Search ................ 333/101, 333/103, 104, 205, 219
See application file for complete search history.

(56) References Cited

U.S. PATENT DOCUMENTS

| | | | |
|---|---|---|---|
| 5,193,218 A | 3/1993 | Shimo | |
| 5,241,291 A * | 8/1993 | Blackburn | .................. 333/219 |
| 5,748,054 A * | 5/1998 | Tonegawa et al. | .......... 333/104 |
| 5,896,563 A | 4/1999 | Kawanami et al. | |
| 6,060,960 A | 5/2000 | Tanaka et al. | |
| 6,448,868 B2 | 9/2002 | Kato et al. | |
| 6,542,021 B2 * | 4/2003 | Isono et al. | .................. 327/365 |
| 6,563,396 B2 | 5/2003 | Tanaka et al. | |
| 6,633,748 B1 | 10/2003 | Watanabe et al. | |
| 6,928,298 B2 | 8/2005 | Furutani et al. | |
| 6,937,845 B2 | 8/2005 | Watanabe et al. | |
| 6,987,984 B1 | 1/2006 | Kemmochi et al. | |
| 7,146,137 B2 * | 12/2006 | Namura | ...................... 455/78 |
| 2002/0032038 A1 | 3/2002 | Furutani et al. | |

FOREIGN PATENT DOCUMENTS

| | | |
|---|---|---|
| JP | 7-202502 A | 8/1995 |
| JP | 7-263901 A | 10/1995 |
| JP | 11-313002 A | 11/1999 |
| JP | 2001-144644 A | 5/2001 |
| JP | 2001-217602 I | 8/2001 |

* cited by examiner

*Primary Examiner*—Dean Takaoka
(74) *Attorney, Agent, or Firm*—Pearne & Gordon LLP

(57) ABSTRACT

To provide a high frequency switch capable of dealing with multiple frequency bands without having plurality of switch circuits. A first diode that conducts due to a bias current when a first switch is closed is interposed between a first signal terminal and a second signal terminal. A strip line with the electrical length $L_1$ is connected to the cathode of the first diode, the other end being grounded. At a position with the distance $L_2$ from one end of the strip line, a capacitor and a second switch are connected to be equivalently grounded when a second switch is closed. The strip line resonates with the electrical length $L_1$ when the second switch is opened, and resonates with the electrical length $L_2$ when the second switch is closed.

2 Claims, 8 Drawing Sheets

HIGH FREQUENCY SWITCH

TECHNICAL FIELD

The present invention relates to a high frequency switch, and more particularly to a high frequency switch for switching the signal path in a high frequency circuit for the mobile communication units.

BACKGROUND ART

A high frequency switch is employed for controlling the connection between sending circuit and antenna, controlling the connection between receiving circuit and antenna, and switching the signal path of high frequency circuit in a mobile communication device such as a portable telephone, a pager and a radio apparatus for business.

The conventional high frequency switch has the capacitors 62, 64 and a diode 63 connected in series between the signal terminals 61 and 65, as shown in FIG. 8. An inductor 66 is connected to the anode of the diode 63, the other end of the inductor 66 being grounded via a capacitor 67. Moreover, a switch 68 is connected at an intermediate point between the inductor 66 and the capacitor 67, the other end of the switch 68 being connected via a resistor 69 to a power supply terminal 70. Also, the cathode of the diode 63 is connected to a strip line 71 with one end grounded.

Herein, the electric length of the strip line 71 corresponds to a quarter wavelength of a high frequency signal used. Also, the inductor 66 has an impedance to be large enough for the high frequency signal in a frequency band used. Moreover, the capacitors 62, 64 are coupling capacitors for cutting DC components of the bias current, and the capacitor 67 is a bypass capacitor for preventing high frequency signal from leaking into the power supply terminal 70.

In the above constitution, if the switch 68 is closed, an electric current supplied from the power supply terminal 70 flows via the resistor 69 to the inductor 66, the diode 63, and the strip line 71. Thereby, the diode 63 conducts in a forward direction bias, enabling the high frequency signal to be transferred between the signal terminals 61 and 65. At this time, the high frequency signal resonates in the strip line 71 grounded, so that the impedance as seen from the diode 63 becomes infinite, whereby the high frequency signal is transferred without loss. On the other hand, if the switch 68 is opened, the diode 63 is in a reverse direction bias to flow no current in a cut-off state, whereby the high frequency signal is not transferred between the signal terminals 61 and 65.

In this manner, the circuit of FIG. 8 controls the high frequency signal to conduct between the signal terminals 61 and 65 by opening or closing the switch 68, and functions as a high frequency switch.

In the recent mobile communication device, the communication systems in different frequency bands coexist along with the increasing number of users and the diversification of functions in frequency band in a specific communication system or at a specific location. To allow one mobile communication device to deal with a plurality of communication systems in different frequency bands, a high frequency switch usable in different frequency bands is required for its sending/receiving circuit.

However, in the high frequency switch with the conventional constitution, because only one usable frequency band is limitatively decided by the electrical length of the strip line, it is necessary to prepare the high frequency switch different for every frequency band to allow one mobile communication device to deal with a plurality of communication systems, resulting in a problem that the circuit becomes complex and a large size.

The present invention has been achieved in the light of the above-mentioned problems, and it is an object of the invention to provide a high frequency switch capable of coping with a plurality of frequency bands without increasing the circuit scale by providing a plurality of switches.

SUMMARY OF THE INVENTION

The present invention firstly provides a high frequency switch characterized by comprising first switch means provided in a transit path of high frequency signals to conduct by application of a DC bias, a strip line that resonates with a first high frequency signal in a predetermined frequency band to be supplied in the transit path of said high frequency signal, with one end connected to said first switch means, and the other end grounded, and second switch means for switching to resonate with a second high frequency signal in the predetermined frequency band by conducting by application of a DC bias to short-circuit a part of said strip line, said second switch means connected in a halfway portion of said strip line. Secondly, the invention provides the high frequency switch, characterized in that a second strip line for resonating with said first high frequency signal is interposed in a path for supplying a DC bias to said first switch means, and third switch means for switching to resonate with said second high frequency signal by short-circuiting a part of said second strip line is provided in a halfway portion of said second strip line.

The high frequency switch with the above constitution is usable in multiple frequency bands by controlling conduction of the first switch means and switching the second switch means or the third switch means. The switch means may be constituted of a diode, for example.

Thirdly, the invention provides a high frequency switch characterized by comprising first switch means provided in a transit path of high frequency signals between a first signal terminal and a second signal terminal to conduct by application of a DC bias, a strip line that resonates with a first high frequency signal in a predetermined frequency band to be supplied to said first signal terminal when said first switch means conducts and is grounded, said strip line connected between said first switch means and said second switch means, a third signal terminal connected between said strip line and said first switch means, and second switch means for switching to resonate with a second high frequency signal in the predetermined frequency band by conducting by application of a DC bias to short-circuit a part of said strip line, said second switch means connected in a halfway portion of said strip line.

Fourthly, the invention provides the high frequency switch, characterized in that a second strip line for resonating with said first high frequency signal is interposed in a path for supplying a DC bias to said first switch means, and third switch means for switching to resonate with said second high frequency signal by short-circuiting a part of said second strip line is provided in a halfway portion of said second strip line. The high frequency switch with the above constitution has a transferable frequency band that can be changed by controlling conduction of the first switch means to switch the transfer path of high frequency signals and switching the second switch means or the third switch means. The switch means may be constituted of a diode, for example. Fifthly, this invention provides a high frequency switch characterized in that a first strip line and a second strip line resonating with high frequency signals having different frequencies are commonly connected to a common signal terminal, in which a first signal terminal and a second signal terminal are connected to the other end of said first and second strip lines, respectively, and first switch means and second switch means for selectively grounding a connection point between said strip line and the signal terminal are provided.

With the above constitution, the high frequency switch can transfer high frequency signals in different frequency bands through independent paths. The switch means may be constituted of a diode, for example.

Figure 1:
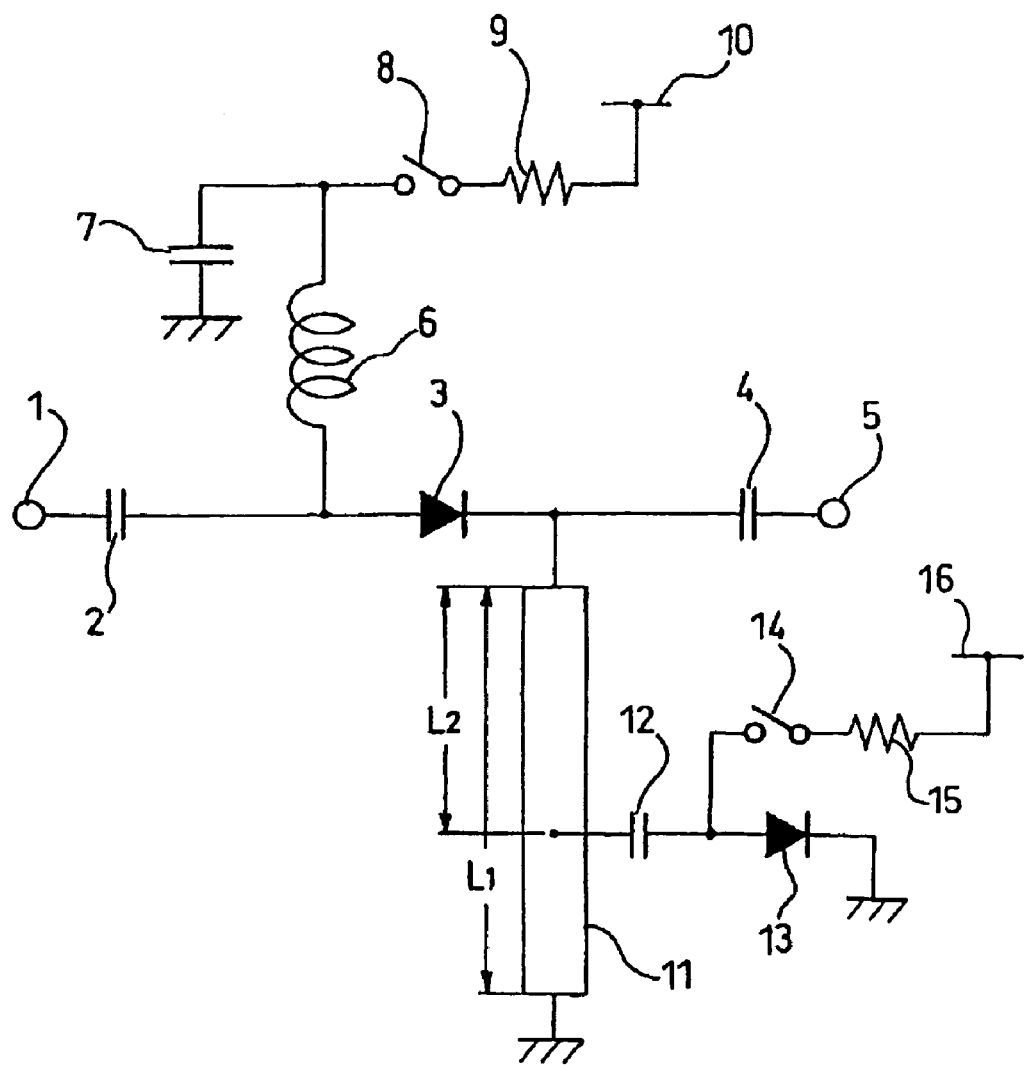
FIG. 1 is a circuit diagram showing the configuration of a high frequency switch according to a first embodiment of the present invention.

In these figures, 1 and 107 denote a first signal terminal, 2, 4, 7, 12, 22, 32, 38, 42, 52, 102, 106, 202 and 206 denote a capacitor, 3 denotes a first diode, 5 denotes a second signal terminal, 6, 34, 44, 104 and 204 denote an inductor, 8 denotes a first switch, 9, 15 and 25 denote a resistor, 10 and 103 denote a first power supply terminal, 11 and 31 denote a strip line, 13, 33 and 203 denote a second diode, 14 denotes a second switch, 16 denotes a second power supply terminal, 21 and 41 denote a second strip line, 23 and 36 denote a third diode, 24 denotes a third switch, 26 denotes a third power supply terminal, 30 and 105 denote a first control terminal, 35 and 205 denote a second control terminal, 37 denotes a third signal terminal, 43 denotes a third control terminal, 44 denotes a fourth switch, 51 denotes a common signal terminal, 101 denotes a first strip line, and 201 denotes a second strip line.

BEST MODE FOR CARRYING OUT THE INVENTION

The preferred embodiments of the present invention will be described below with reference to the accompanying drawings. In the drawings, the common components are designated by the same numerals.

First Embodiment

FIG. 1 is a circuit diagram showing the configuration of a high frequency switch according to a first embodiment of the present invention.

In FIG. 1, a first signal terminal 1 is connected via a capacitor 2 to the anode of a first diode 3 as switching means, the cathode of the first diode 3 being connected via a capacitor 4 to a second signal terminal 5. An inductor 6 is connected to the anode of the first diode 3, the other end of this inductor 6 being connected to a capacitor 7 and a first switch 8. And the other end of the capacitor 7 is grounded, and the other end of the first switch 8 is connected via a resistor 9 to a first power supply terminal 10.

Also, the cathode of the first diode 3 is connected to a strip line 11 having the electrical length L1. A capacitor 12 is connected at a position with the distance L2 from one end in a halfway portion of the strip line 11, the other end of the capacitor 12 being connected to the anode of a second diode 13 and a second switch 14 as switch means, and the cathode of the second diode 13 is grounded. And the other end of the second switch 14 is connected via a resistor 15 to a second power supply terminal 16.

Herein, the capacitor 7 is the bypass capacitor for preventing high frequency signals from leaking into the first power supply terminal 10, and reducing the impedance at a frequency used for this high frequency switch at a terminal of the inductor 6 on the switch 8 side. Also, the capacitors 2, 4 and 12 are coupling capacitors for cutting the DC components which are inserted to prevent a bias current of the first diode 3 and the second diode 13 from flowing into the high frequency circuit connected to the first and second signal terminals 1 and 5. Each of these capacitors has a small enough impedance for the high frequency signal in the frequency band for use.

Also, the inductor 6 has a large enough impedance for the high frequency signal in the frequency band for use, and prevents high frequency signals from leaking into the first power supply terminal 10 when the first switch 8 is closed. Also, the first and second diodes 3 and 13 use a PIN diode or a band switching diode. And the strip line 11 is configured such that the electrical lengths L1 and L2 have the relation of $L1=\lambda1/4$, $L2=\lambda2/4$ for a first high frequency signal in a frequency band with the central frequency f1 and the wavelength $\lambda1$ and a second high frequency signal in a frequency band with the central frequency f2 and the wavelength $\lambda2$.

The operation of the high frequency switch according to the first embodiment of the invention will be described below.

First of all, when the first switch 8 is opened, the first diode 3 is in a cut-off state, because no bias current flows from the first power supply terminal 10. Accordingly, the high frequency signal is not transferred between the first signal terminal 1 and the second signal terminal 5.

Then, when the first switch 8 is closed, a bias current flows in a path from the first power supply terminal 10 to the resistor 9, the inductor 6, the first diode 3 and the strip line 11. Thereby, the first diode 3 is conducting in the forward direction bias, so that the high frequency signal can be transferred between the first signal terminal 1 and the second signal terminal 5.

At this time, if the second switch 14 is open, the second diode 13 is in a cut-off state because no current flows from the second power supply terminal 16, whereby a circuit containing the capacitor 12 and the second diode 13 is equivalently ignored. Accordingly, the strip line 11 is grounded with the electrical length L1, and resonates with a first high frequency signal with frequency f1 and wavelength $\lambda1$, so that the impedance as seen from the first diode 3 becomes infinite. However, it does not resonate with a second high frequency signal with frequency f2 and wavelength $\lambda2$, so that the impedance as seen from the first diode 3 becomes small. Thereby, the first high frequency signal can be only transferred between the first signal terminal 1 and the second signal terminal 5.

On the other hand, if the second switch 14 is closed, a forward bias current flows from the power supply terminal 16 via the resistor 15 to the second diode 13, so that the second diode 13 conducts. Accordingly, for the high frequency signal, the strip line 11 is equivalent to that grounded with the electrical length L2 via the capacitor 12 and the second diode 13.

Figure 2:
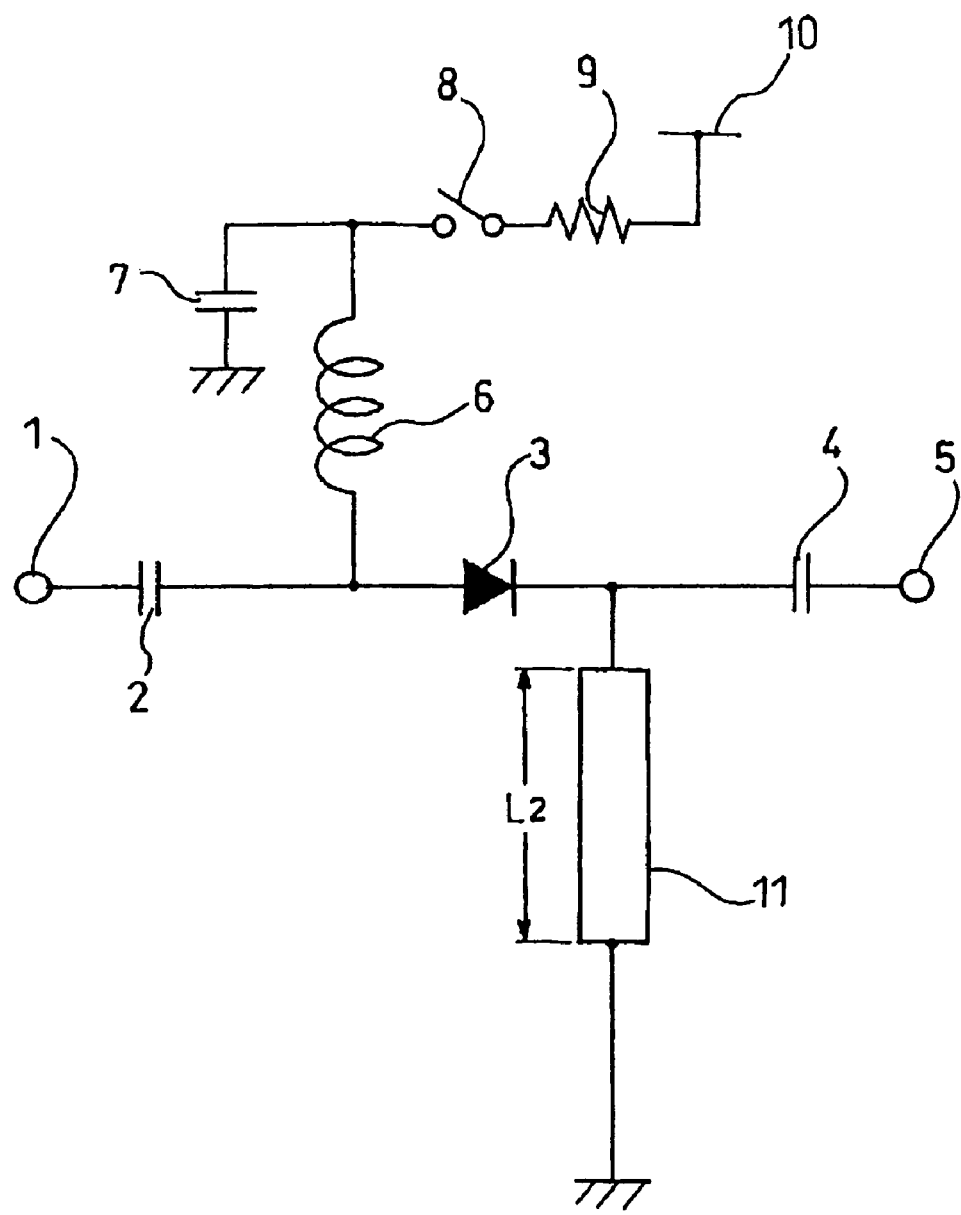
FIG. 2 is an equivalent circuit diagram of the high frequency switch of FIG. 1 in which a first switch and a second switch are closed.

In an equivalent circuit of FIG. 2, the strip line 11 is grounded with the electrical length L2, and resonates with a second high frequency signal with frequency f2 and wavelength λ2, so that the impedance as seen from the anode of the first diode 3 becomes infinite. Thereby, the second high frequency signal can be only transferred between the first signal terminal 1 and the second signal terminal 5.

In this manner, with the first embodiment of the invention, conduction of the first diode 3 is controlled by opening or closing the first switch 8, and the transferable frequency band between the first signal terminal 1 and the second signal terminal 5 can be changed by switching the second switch 14, whereby this high frequency switch is usable in multiple frequency bands. If both the frequency bands are selected to be closer, the transferable frequency bands become almost continuous, thereby enabling the high frequency switch to operate in a wider band.

In the first embodiment, one frequency switching circuit consisting of the second diode 13 and the second switch 14 is provided to switch between two frequency bands. However, the strip line 11 is provided with a plurality of branches, for which corresponding switching circuits are provided, whereby the high frequency switch is usable in multiple bands or wider band.

Also, electric currents from the first and second power supply terminal 10 and 16 are controlled by opening or closing the first switch 8 and the second switch 14, respectively, but may be controlled by a control signal for outputting a specific waveform.

Second Embodiment

Figure 3:
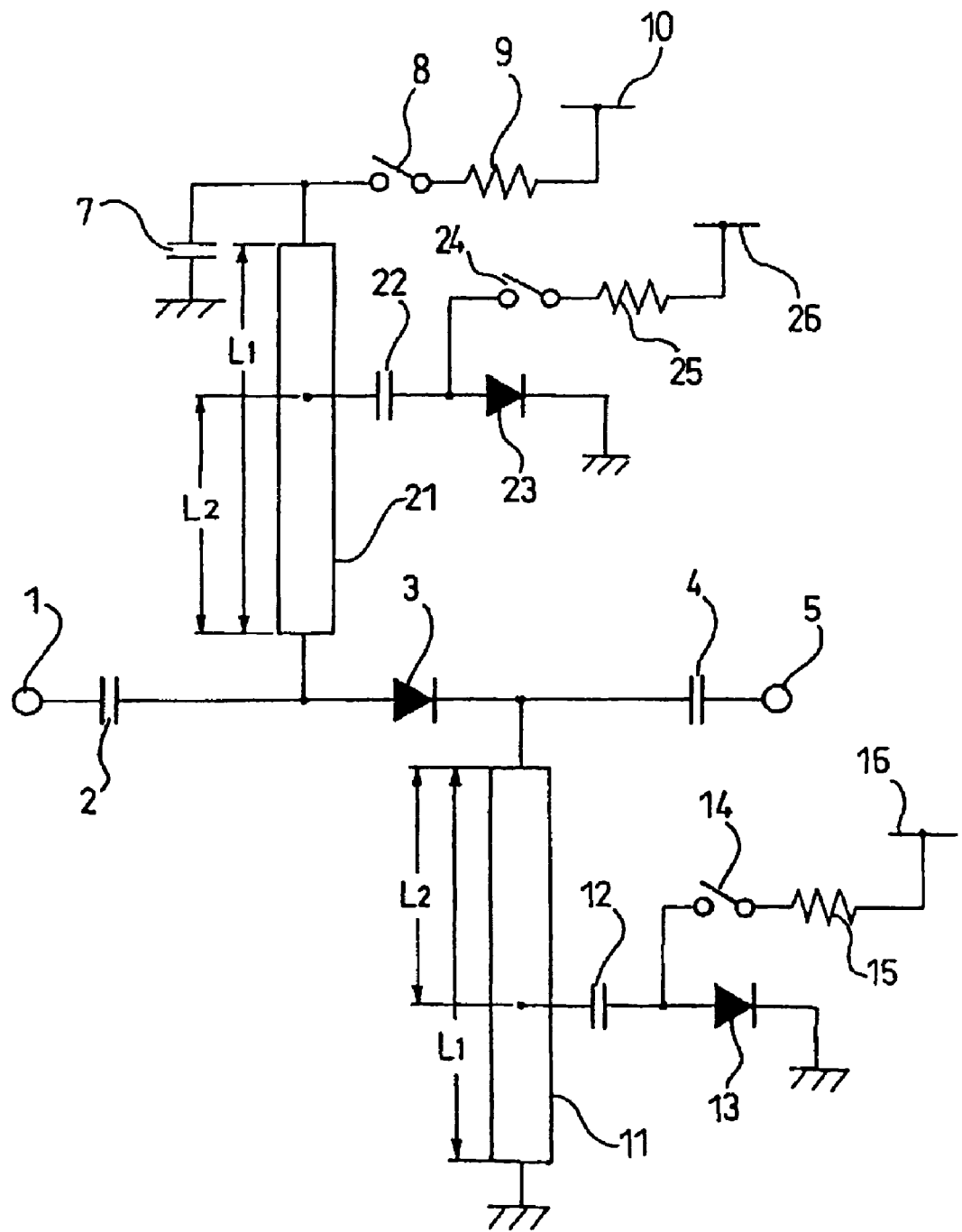
FIG. 3 is a circuit diagram showing the configuration of a high frequency switch according to a second embodiment of the invention.

FIG. 3 is a circuit diagram showing the configuration of a high frequency switch according to a second embodiment of the invention. A strip line having the electrical length changeable is provided, instead of the inductor 6 in the configuration of the first embodiment of FIG. 1. The same parts are designated by the same numerals as in FIG. 1. In FIG. 3, a second strip line 21 having the same electrical length L1 as the strip line 11 is connected to the anode of a first diode 3, the other end of the second strip line 21 being connected to one end of the capacitor 7 and the first switch 8. A capacitor 22 is connected at a position with the distance L2 from one end in a halfway portion of the second strip line 21, the other end of the capacitor 22 being connected to the anode of a third diode 23 and a third switch 24 as switch means, and the cathode of the third diode 23 is grounded. Moreover, the other end of the third switch 24 is connected via a resistor 25 to a third power supply terminal 26.

Herein, the capacitor 22 is the coupling capacitor for cutting the DC components, which is inserted to prevent a bias current from flowing via the third diode 23, and has a small enough impedance for the high frequency signal in the frequency band for use.

The operation of the high frequency switch according to the second embodiment of the invention will be described below.

First of all, when the first switch 8 is opened, the high frequency signal is not transferred between the first signal terminal 1 and the second signal terminal 5, because no bias current flows from the first power supply terminal 10 to the first diode 3, as in the first embodiment. Then, when the first switch 8 is closed, a bias current flows in a path from the first power supply terminal 10 to the resistor 9, the second strip line 21, the first diode 3 and the strip line 11. Thereby, the first diode 3 is conducting in the forward direction bias, so that the high frequency signal can be transferred between the first signal terminal 1 and the second signal terminal 5.

In this state, if the second switch 14 is open, the strip line 11 resonates with a first high frequency signal with frequency f1 and wavelength λ1, as described in the first embodiment, so that the impedance as seen from the first diode 3 becomes infinite.

At the same time, if the third switch 24 is open, the third diode 23 is in the cut-off state, because no current flows from the third power supply terminal 26, whereby a circuit containing the capacitor 22 and the third diode 23 is equivalently ignored. Accordingly, for the high frequency signal, the second strip line 21 is equivalent to that grounded with the electrical length L2 via the capacitor 12, and resonates with a first high frequency signal with frequency f1 and wavelength λ1, like the strip line 11, so that the impedance as seen from the cathode of the first diode 3 becomes infinite. Thereby, the first high frequency signal can be only transferred between the first signal terminal 1 and the second signal terminal 5.

On the other hand, if the second switch 14 is closed, the strip line 11 resonates with a second high frequency signal with frequency f2 and wavelength λ2, so that the impedance as seen from the anode of the first diode 3 becomes infinite, as described in the first embodiment.

At this time, if the third switch 24 is closed, a forward bias current flows through the third diode 23 from the third power supply terminal 26 via the resistor 25, so that the third diode 23 conducts. Accordingly, the second strip line 21 is equivalently grounded with the electrical length L2 via the capacitor 22 and the third diode 23 as shown in an equivalent circuit of FIG. 4.

Figure 4:
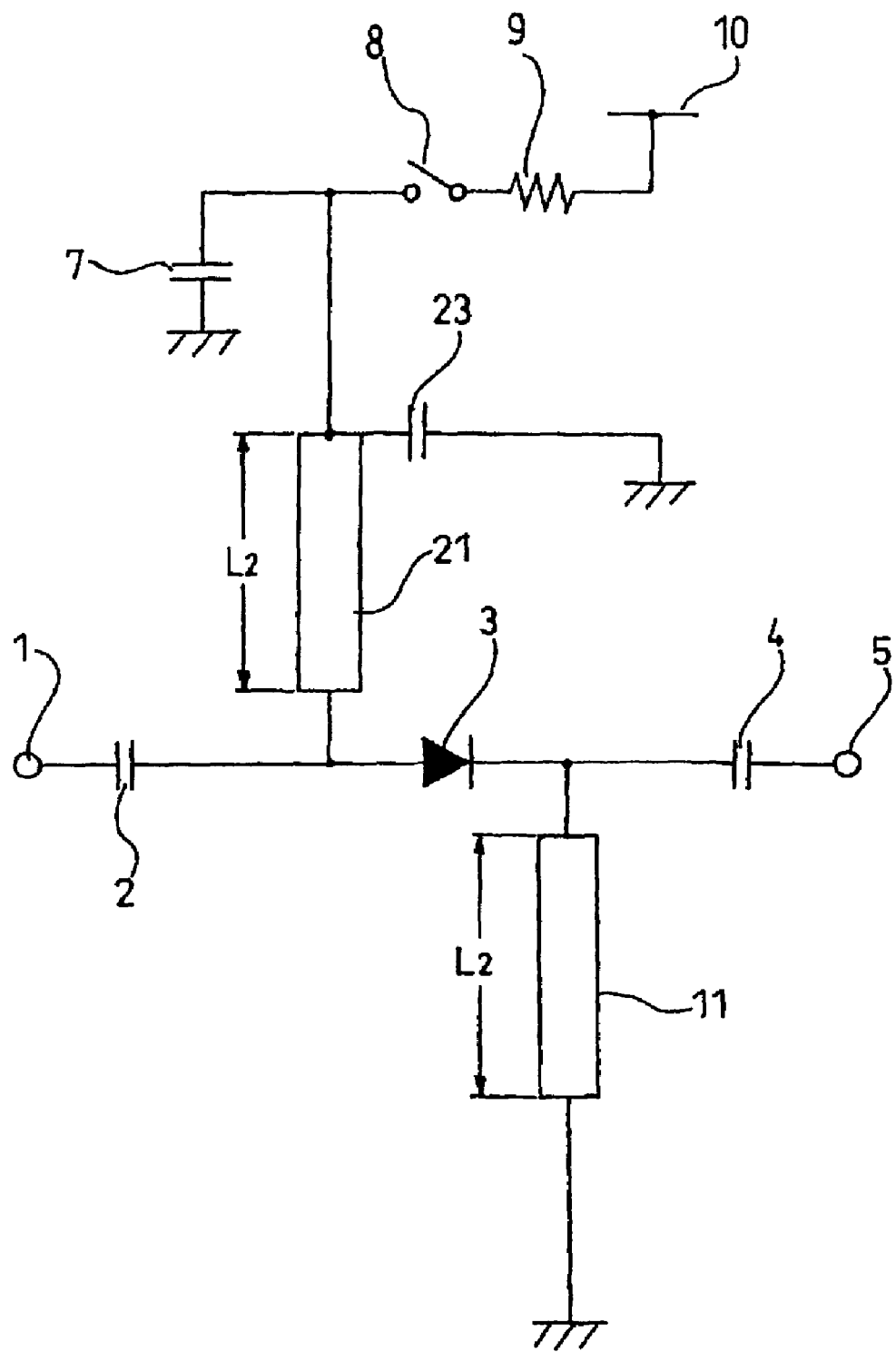
FIG. 4 is an equivalent circuit diagram of the high frequency switch of FIG. 1 in which a second switch and a third switch are closed.

In the equivalent circuit of FIG. 4, the second strip line 21 grounded with the electrical length L2 resonates with a second high frequency signal with frequency f2 and wavelength λ2, so that the impedance as seen from the anode of the first diode 3 becomes infinite. Thereby, the second high frequency signal can be only transferred between the first signal terminal 1 and the second signal terminal 5.

In this manner, with the second embodiment of the invention, conduction of the first diode 3 is controlled by opening or closing the first switch 8, and the transferable frequency band between the first signal terminal 1 and the second signal terminal 5 can be changed by switching the second switch 14 and the third switch 24 at the same time, whereby this high frequency switch is usable in multiple frequency bands.

The second embodiment has the same effect as the first embodiment. Furthermore, the second strip line 21 resonating with any of the first and second high frequency signals and having the infinite impedance is employed in the path for supplying bias current to the first diode 3, whereby there is a specific effect of the second embodiment that the transmission loss of high frequency signals is quite smaller than in the first embodiment using the inductor 6 of FIG. 1.

Third Embodiment

Figure 5:
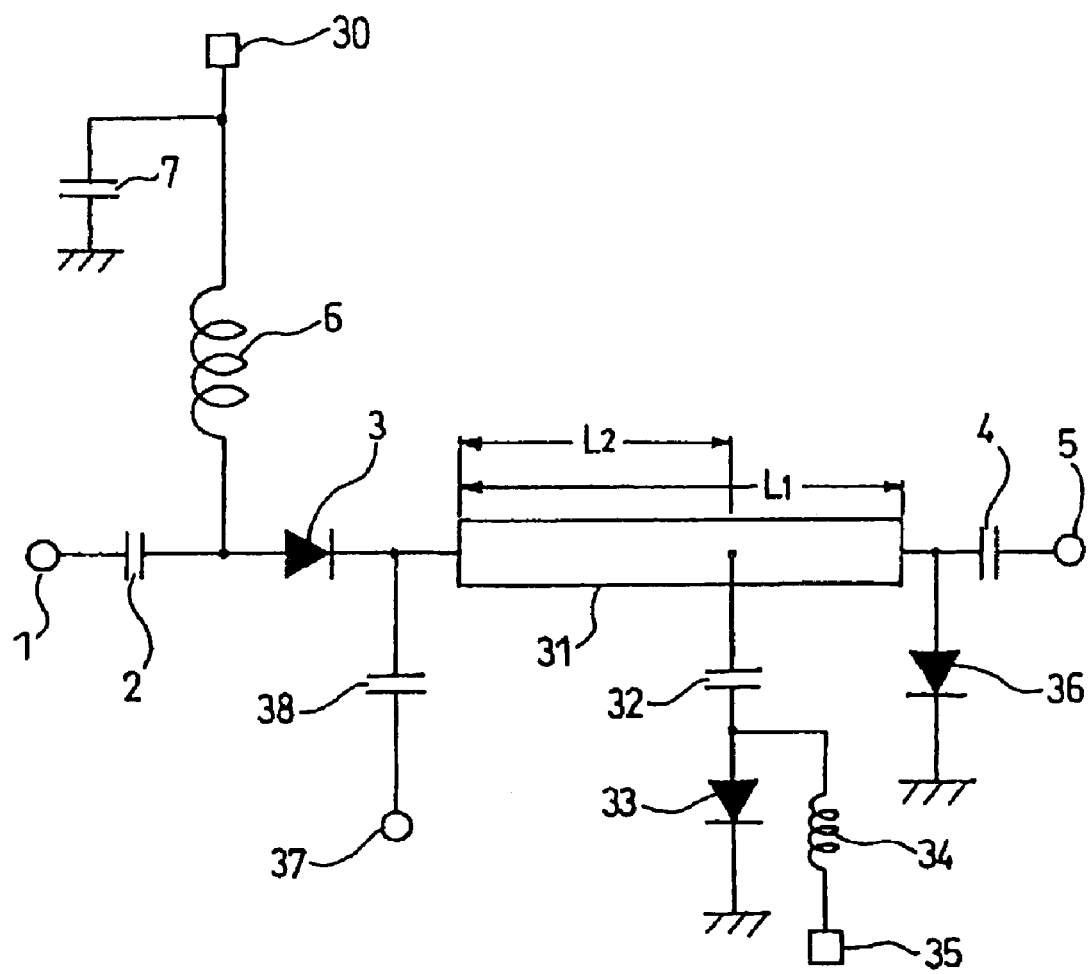
FIG. 5 is a circuit diagram showing the configuration of a high frequency switch according to a third embodiment of the invention.

FIG. 5 is a circuit diagram showing the configuration of a high frequency switch according to a third embodiment of the invention. The same parts are designated by the same numerals as in FIG. 1, and the description for those parts is omitted.

In FIG. 5, a first signal terminal 1 is connected via a capacitor 2 to the anode of a first diode 3 as switching means. An inductor 6 is connected to the anode of the first diode 3, the other end of this inductor 6 being connected to the capacitor 8 with one end connected to a first control terminal 30.

A third signal terminal 37 is connected via a capacitor 38 to the cathode of the first diode 3, which is then connected to a strip line 31 with the electrical length L1. A capacitor 32 is connected at a position with the distance L2 from one end in a halfway portion of the strip line 31, the other end of the capacitor 32 being connected to the anode of a second diode 33 and an inductor 34 as switch means. Moreover, the cathode of the second diode 33 is grounded, and the other end of the inductor 34 is connected to a second control terminal 35. Also, the other end of the strip line 31 is connected to a third diode 36 with one end grounded and the capacitor 11, the other end of which is connected to the second signal terminal 5.

Herein, the capacitors 32 and 38 are the coupling capacitors for cutting the DC components, the capacitor 32 being inserted to prevent a bias current of the second diode 33 from flowing into the strip line 31, and the capacitor 38 being inserted to prevent bias current of the first diode 3 from leaking into the first signal terminal 37. Each of these capacitors has a small enough impedance for the high frequency signal in the frequency band for use.

Also, the inductor 34 has a large enough impedance for the high frequency signal in the frequency band for use, and prevents high frequency signals transferred to the strip line 31 from leaking into the second control terminal 35.

The operation of the high frequency switch according to the third embodiment of the invention will be described below.

First of all, if a positive voltage is applied to the first control terminal 30, a bias current flows in a path from the inductor 6 through the first diode 3 and the strip line 31 to the third diode 36. At this time, if no positive voltage is applied to the second control terminal 35, the second diode 33 has no current flowing and is in the cut-off state, whereby a circuit containing the capacitor 32 and the second diode 33 is equivalently ignored. Accordingly, the strip line 31 is grounded with the electrical length L1 via the third diode 36, and resonates with a first high frequency signal with frequency f1 and wavelength λ1, so that the impedance as seen from the first diode 3 becomes infinite. However, it does not resonate with a second high frequency signal with frequency f2 and wavelength λ2, so that the impedance as seen from the anode of the first diode 3 becomes small. Thereby, the first high frequency signal can be only transferred between the first signal terminal 1 and the third signal terminal 37.

On the other hand, if a positive voltage is applied to the first control terminal 30, and a positive voltage is applied to the second control terminal 35 at the same time, the second diode 33 has a forward bias current flowing via the inductor 34 and conducts. Accordingly, for the high frequency signal, the strip line 31 is equivalent to that grounded with the electrical length L2 via the capacitor 32 and the second diode 33. Thus, the strip line 31 resonates with a second high frequency signal with frequency f2, so that the impedance as seen from the anode of the first diode 3 becomes infinite. Thereby, the second high frequency signal can be only transferred between the first signal terminal 1 and the third signal terminal 37. If no positive voltage is applied to the first control terminal 30, no bias current flows through the first diode 3 and the third diode 36. Accordingly, no high frequency signal is transferred between the first signal terminal 1 and the third signal terminal 37, and between the first signal terminal 1 and the second signal terminal 5. At this time, if no positive voltage is applied to the second control terminal 35, the second diode 33 has no current flowing and is in the cut-off state, whereby a circuit containing the capacitor 32 and the second diode 33 is equivalently ignored.

Thereby, both the first and second high frequency signals can be transferred between the second signal terminal 5 and the third signal terminal 37.

In this manner, with the third embodiment of the invention, the transferable path of high frequency signals can be switched between the first signal terminal 1 and the third signal terminal 37, or between the second signal terminal 5 and the third signal terminal 37 by controlling the voltage applied to the first control terminal 30. Also, when a positive voltage is applied to the first control terminal 30, the transferable frequency band between the first signal terminal 1 and the third signal terminal 37 can be changed, depending on whether or not the positive voltage is applied to the second control terminal 35, whereby this high frequency switch is usable in multiple frequency bands.

This reduces the transferring loss as compared with the conventional high frequency switch prepared for every frequency band, because the switches for transferring the high frequency signal can be less. The signal is only transferred through the diode 3 among the diodes causing distortion, whereby the harmonic distortion is favorable.

Further, with the third embodiment of the invention, like the first and second embodiments, the high frequency switch is usable in the wide area by selecting two frequency bands closely. It is clear that the multi-band or wide band is allowed by providing plural branches and circuits on the strip line 31.

In a circuit of FIG. 5, if the first signal terminal 1 is connected to a sending circuit, the second signal terminal 2 is connected to a receiving circuit, and the third signal terminal 37 is connected to the antenna, the high frequency switch for switching one antenna between the sending and receiving circuits can be constituted, resulting in a simplified circuit configuration of the mobile communication device.

Fourth Embodiment

Figure 6:
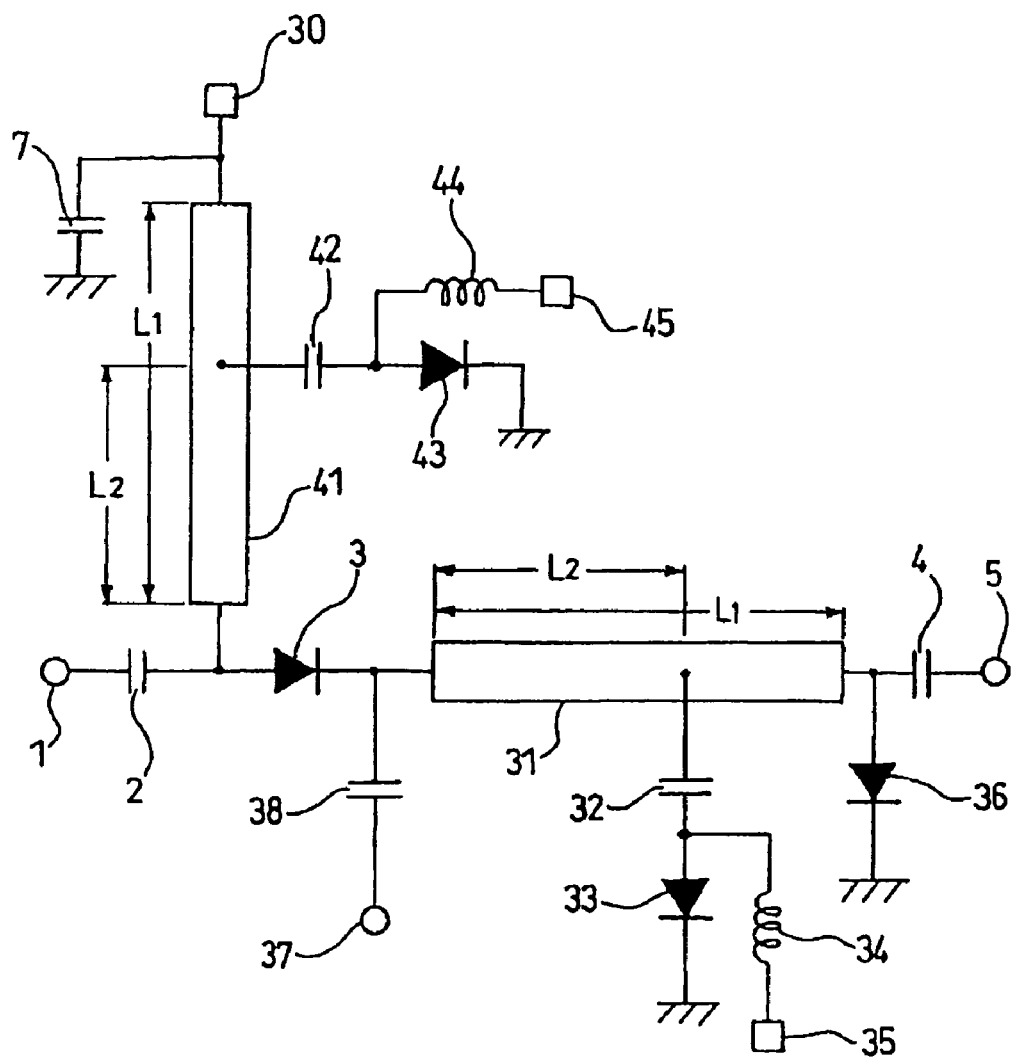
FIG. 6 is a circuit diagram showing the configuration of a high frequency switch according to a fourth embodiment of the invention.

FIG. 6 is a circuit diagram showing the configuration of a high frequency switch according to a fourth embodiment of the invention. A strip line having the electrical length changeable is provided, instead of the inductor 6 in the configuration of the third embodiment of FIG. 5. The same parts are designated by the same numerals as in FIG. 5, and the description of those parts is omitted.

In FIG. 6, a second strip line 41 having the same electrical length L1 as the strip line 31 has its one end connected to the anode of the first diode 3 as switch means, the other end of the second strip line 41 being connected to the capacitor 7 and the first control terminal 30. A capacitor 42 is connected at a position with the distance L2 from one end in a halfway portion of the second strip line 41, the other end of the capacitor 42 being connected to the anode of a fourth diode 43 and an inductor 44 as switch means. Moreover, the other end of the inductor 44 is connected to a third control terminal 45 and the cathode of the fourth diode 43 is grounded.

Herein, the capacitor 42 is the coupling capacitor for cutting the DC components, which is inserted to prevent a bias current from not flowing via the second strip line 41 and the fourth diode 43 into the first diode 3, when a positive voltage is applied to the first control terminal 30, and has a small enough impedance for the high frequency signal in the frequency band for use.

Also, the inductor 44 has a large enough impedance for the high frequency signal in the frequency band for use, and prevents high frequency signals from leaking into the third control terminal 45.

The operation of the high frequency switch according to the fourth embodiment of the invention will be described below.

First of all, if a positive voltage is applied to the first control terminal 30, a bias current flows in a path from the second strip line 41 through the first diode 3 and the strip line 31 to the third diode 36. Then, the high frequency signal can be transferred between the first signal terminal 1 and the third signal terminal 37, as in the third embodiment. Furthermore, if no positive voltage is applied to the second control terminal 35, a circuit containing the capacitor 32 connected to the strip line 31 and the second diode 33 is equivalently ignored as in the third embodiment. At the same time, if no positive voltage is applied to the third control terminal 45, a circuit containing the capacitor 42 and the fourth diode 43 is also equivalently ignored.

Accordingly, the strip line 31 and the second strip line 41 are grounded with the electrical length L1 via the third diode 36 and the capacitor 7, respectively, and resonates with a first high frequency signal with frequency f1 and wavelength λ1, so that the impedance as seen from the first diode 3 becomes infinite. Thereby, the first high frequency signal can be only transferred between the first signal terminal 1 and the third signal terminal 37.

On the other hand, if a positive voltage is applied to the first control terminal 30, and a positive voltage is applied to both the second control terminal 35 and the third control terminal 37 at the same time, a forward bias current flows through the second diode 33 and the fourth diode 43, whereby the strip line 31 and the second strip line 41 are equivalently grounded with the electrical length L2. Thus, the strip line 31 and the second strip line 41 resonate with a second high frequency signal with frequency f2, whereby the second high frequency signal can be only transferred between the first signal terminal 1 and the third signal terminal 37.

If no positive voltage is applied to the first control terminal 30, no high frequency signal is transferred between the first signal terminal 1 and the third signal terminal 37, and between the first signal terminal 1 and the second signal terminal 5 as in the third embodiment. At this time, if no positive voltage is applied to the second control terminal 35, both the first and second high frequency signals can be transferred between the second signal terminal 5 and the third signal terminal 37 as in the third embodiment.

In this manner, with the fourth embodiment of the invention, the transferable path of high frequency signals can be switched between the first signal terminal 1 and the third signal terminal 37, or between the second signal terminal 5 and the third signal terminal 37 by controlling the voltage applied to the first control terminal 30 as in the third embodiment.

This fourth embodiment is functionally identical to the third embodiment as previously described, and has the same features. Moreover, the specific features of the fourth embodiment include the following. That is, when a positive voltage is applied to the first control terminal 30 to enable the high frequency signal to be transferred between the first signal terminal 1 and the third signal terminal 37, the strip line 31 and the second strip line 41 have the electrical length changed to resonate in the frequency band used by controlling the voltage applied to the second control terminal 35 and the third control terminal 45 at the same time, whereby the transferring loss of the high frequency switch can be quite reduced.

Fifth Embodiment

Figure 7:
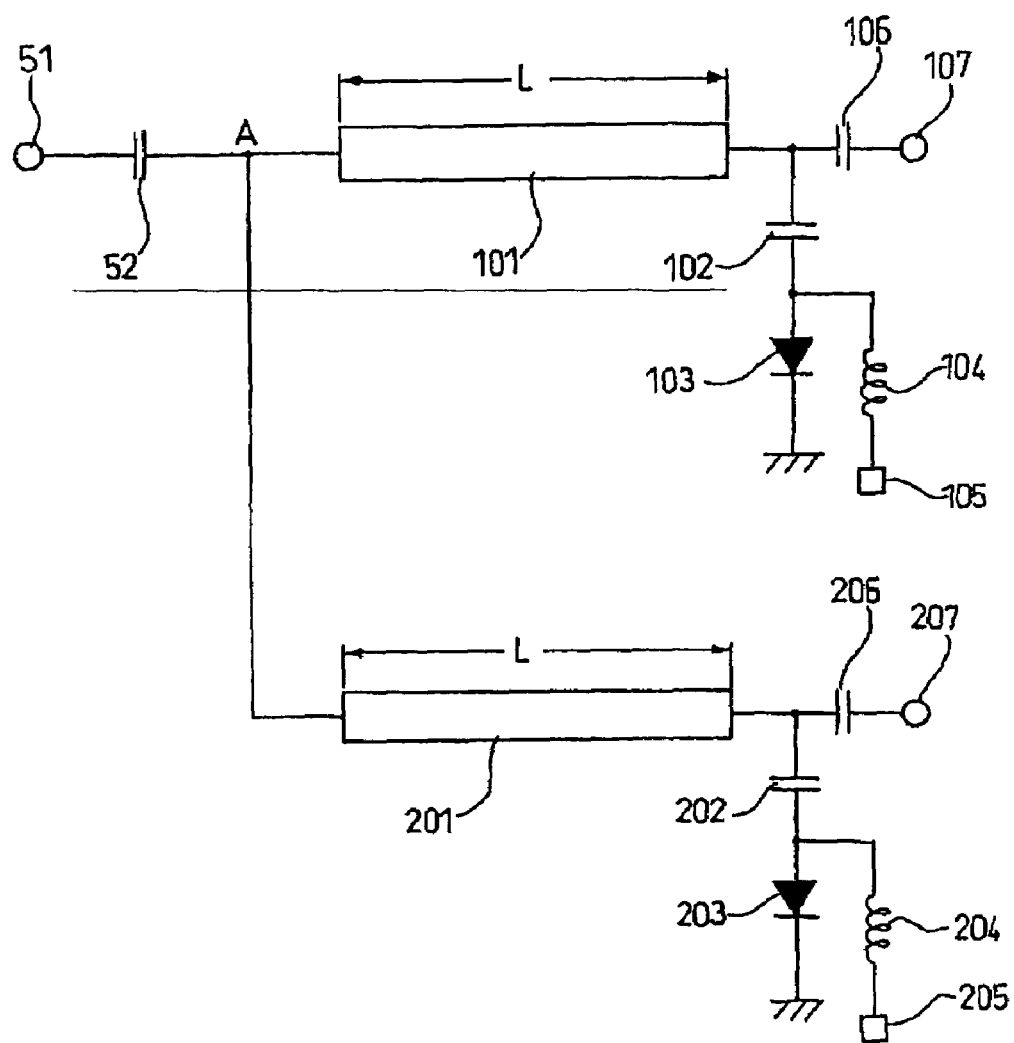
FIG. 7 is a circuit diagram showing the configuration of a high frequency switch according to a fifth embodiment of the invention.
Figure 8:
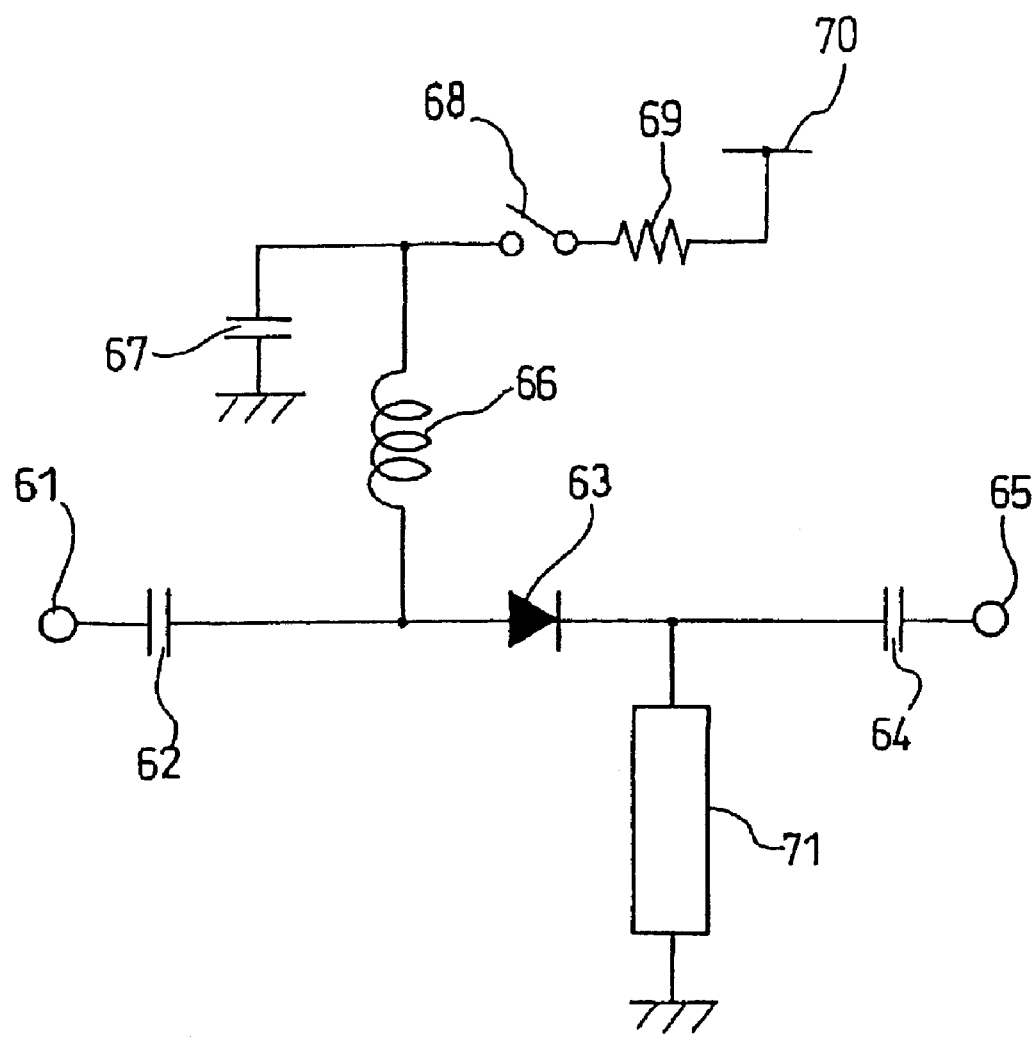
FIG. 8 is a circuit diagram showing the configuration of a high frequency switch of the prior art.

FIG. 7 is a circuit diagram showing the configuration of a high frequency switch according to a fifth embodiment of the invention.

In FIG. 7, a capacitor 52 is connected to a common signal terminal 51, and a fist strip line 101 and a second strip line 201 are connected to the other end of the capacitor 52.

A capacitor 102 is connected to the first strip line 51, and a first diode 103 and an inductor 104 as switching means are connected to the other end of this capacitor 012. And the other end of the first diode 103 is grounded, the other end of the inductor 104 being connected to a first control terminal 105. Also, a capacitor 106 is connected to the other end of the first strip line 101, the other end of the capacitor 106 being connected to a first signal terminal 107.

On the other hand, the second strip line 201, which has the same configuration as above, is connected to a capacitor 202, a second diode 203 as switching means, an inductor 204, and a second control terminal 205, and connected to a capacitor 206, the other end of the capacitor 206 being connected to a second signal terminal 207.

Herein, the first strip line 101 is configured such that the electrical length L2 has the relation of L2=λ2/4 for a second high frequency signal in a frequency band with the central frequency f2 and the wavelength λ2. Also, the second strip line 201 is configured such that the electrical length L1 has the relation of L1=λ1/4 for a first high frequency signal in a frequency band with the central frequency f1 and the wavelength λ1.

Moreover, the capacitors 52, 102, 106, 202 and 206 are coupling capacitors for cutting the DC components which are inserted to prevent a bias current from the control terminals 105 and 205 from flowing into the high frequency circuit connected to the signal terminals 51, 107 and 207. Each of these capacitors has a small enough impedance for the high frequency signal in the frequency band for use.

The operation of the high frequency switch according to the fifth embodiment of the invention will be described below.

First of all, when no voltage is applied to the first control terminal 105, the first diode 103 is in the cut-off state, because no current flows through the first diode 103. Hence, a circuit containing the capacitor 102 and the second diode 103 is equivalently ignored. The common signal terminal 51 and the first signal terminal 107 conduct to enable the high frequency signal to be transferred.

Then, if a positive voltage is applied to the second control terminal 205, a bias current flows via the inductor 205 and the second diode 203, whereby the second strip line 201 is equivalently grounded with the electrical length L1, and resonates with a first high frequency signal with frequency f1 and wavelength λ1, so that the impedance as seen from the connection point A becomes infinite. Thereby, the first high frequency signal can be only transferred between the common signal terminal 51 and the first signal terminal 107.

On the other hand, if a positive voltage is applied to the first control terminal 105 and no voltage is applied to the second control terminal 206, the first strip line 101 in complementary relation is equivalently grounded with the electrical length L2, and resonates with a second high frequency signal with frequency f2 and wavelength λ2, so that the impedance as seen from the connection point A becomes infinite. Thereby, the second high frequency signal can be only transferred between the common signal terminal 51 and the second signal terminal 207.

In this manner, with the fifth embodiment of the invention, the high frequency switch is constituted in which the first and second high frequency signals in different frequency bands are transferred through independent paths by controlling the voltage applied to the first control terminal 105 and the second control terminal 205. Because no diode is employed in the transmission path of the high frequency signal, there is the effect that the loss cause by the high frequency signal of large power being transferred through the diode is minimized, and the harmonic distortion characteristic is favorable.

Moreover, in a circuit of FIG. 7, if the common signal terminal 51 is connected to the antenna, the first signal terminal 107 is connected to a sending circuit, and the second signal terminal 207 is connected to a receiving circuit, the high frequency switch is constituted of a simple circuit in which one antenna is easily switched and commonly used between the sending and receiving circuits of different frequency bands, can be constituted.

In the fifth embodiment as above described, the electrical length of the strip line constituting the high frequency switch is changed by controlling the supply of bias current, whereby the high frequency switch is usable in multiple frequency bands or wide band.

Also, the transferable path of high frequency signals is switched by controlling the voltage applied to the control terminal, and the electrical length of the strip line is changed, whereby the high frequency switch capable of transferring the high frequency signal in multiple frequency bands is provided.

Moreover, a plurality of transferring paths of high frequency signals are provided, and the voltage applied to the control terminal is controlled, whereby the high frequency switch capable of transferring the high frequency signal in different frequency bands through independent paths is provided.

The present invention has been described in detail with reference to the specific embodiments, but it will be apparent to those skilled in the art that various modifications or variations may be made without departing from the scope or spirit of the invention.

This application is based on JP-A-2001-279762, filed on Sep. 14, 2001, its contents being incorporated herein by reference.

INDUSTRIAL APPLICABILITY

As above described, there is the effect that the high frequency switch capable of dealing with multiple frequency bands is provided without making the circuit scale larger by providing a plurality of switch circuits.

What is claimed is:

1. A high frequency switch, comprising:
   a first switch that is provided in a transmit path of high frequency signals between a first signal terminal and a second signal terminal, and conducts based on application of a DC bias;
   a strip line that resonates with a first high frequency signal in a predetermined frequency band which is supplied to said first signal terminal when said first switch conducts, wherein the strip line is grounded and is connected between said first switch and said second signal terminal;
   a third signal terminal that is connected between said strip line and said first switch; and
   a second switch that switches so as to resonate the strip line with a second high frequency signal in a predetermined frequency band by conducting based on application of a DC bias to short-circuit a part of said strip line, said second switch connected in a halfway portion of said strip line.

2. The high frequency switch according to claim 1, wherein a second strip line for resonating with said first high frequency signal is interposed in a path for supplying a DC bias to said first switch, and
   wherein a third switch, that switches so as to resonate said second strip line with said second high frequency signal by short-circuiting a part of said second strip line so as to be grounded, is provided in a halfway portion of said second strip line.

* * * * *